(12) United States Patent
Meyer et al.

(10) Patent No.: US 12,071,292 B2
(45) Date of Patent: Aug. 27, 2024

(54) FLEXIBLE RECYCLABLE PACKAGE

(71) Applicant: AEROFLEXX, LLC, West Chester, OH (US)

(72) Inventors: Andrew Meyer, Bolingbrook, IL (US); Cedric D'Souza, Mason, OH (US); Lianna Dini, West Chester, OH (US)

(73) Assignee: AEROFLEXX, LLC, West Chester, OH (US)

( * ) Notice: Subject to any disclaimer, the term of this patent is extended or adjusted under 35 U.S.C. 154(b) by 0 days.

(21) Appl. No.: 17/588,539

(22) Filed: Jan. 31, 2022

(65) Prior Publication Data
US 2022/0242639 A1 Aug. 4, 2022

Related U.S. Application Data

(60) Provisional application No. 63/144,314, filed on Feb. 1, 2021.

(51) Int. Cl.
*B65D 75/32* (2006.01)
*B32B 1/00* (2024.01)
(Continued)

(52) U.S. Cl.
CPC ............... *B65D 75/32* (2013.01); *B32B 1/00* (2013.01); *B32B 7/12* (2013.01); *B32B 27/08* (2013.01);
(Continued)

(58) Field of Classification Search
CPC ...... B65D 75/32; B65D 75/5805; B32B 1/00; B32B 7/12; B32B 27/08; B32B 27/18;
(Continued)

(56) References Cited

U.S. PATENT DOCUMENTS 9,469,088 B2 * 10/2016 Stanley .................. B65D 75/54
2001/0003021 A1 6/2001 Shepard et al.
2002/0182351 A1 12/2002 Akiyama et al.

FOREIGN PATENT DOCUMENTS

CN    2513945 Y     10/2002
JP    2009-051212 A  3/2009
JP    2017-128068 A  7/2017

OTHER PUBLICATIONS

International Search Report and Written Opinion filed in PCT/US2022/014490 mailed on May 10, 2022; 10 pgs.

* cited by examiner

*Primary Examiner* — Michael C Miggins
(74) *Attorney, Agent, or Firm* — Vedder Price P.C.

(57) ABSTRACT

An improved nylon-free recyclable multilayer package and a method for manufacturing the same is provided that addresses the shortcomings of currently available recyclable materials for flexible packaging and containers. One object of embodiments of the present invention will be to provide a flexible plastic package suitable for curbside recycling, for example, a package that may be in compliance with recyclability as defined by the Association of Plastic Recyclers (APR). One such embodiment comprises a package manufactured from a material that is substantially free of nylon. Another or a second embodiment comprises a package manufactured from a material using a certain optimized ratio of compatibilizers in order to achieve suitable packaging performance and standards for recyclability. The flexible recyclable multilayer packaging material comprises a first laminate film and a second laminate film. The first laminate film further comprises, in order: a first sealable polyethylene layer with low initial seal band defining an exterior layer of the first laminate film; a second sealable polyethylene having a certain pre-determined thickness; a first tie layer; a first gas barrier layer of ethylene vinyl alcohol (EVOH); a second
(Continued)

tie layer; a second sealable polyethylene layer; and a third sealable polyethylene layer. The second laminate film further comprises, in order: a first sealable polyethylene layer with low initial seal band defining an exterior layer of the second laminate film; a first sealable polyethylene layer having a certain pre-determined thickness; a first tie layer; a first gas barrier layer of ethylene vinyl alcohol (EVOH); a second tie layer; a second sealable polyethylene layer; a third sealable polyethylene layer; and wherein the flexible material is substantially free of nylon.

39 Claims, 4 Drawing Sheets

(51) Int. Cl.
  *B32B 7/12* (2006.01)
  *B32B 27/08* (2006.01)
  *B32B 27/18* (2006.01)
  *B32B 27/30* (2006.01)
  *B32B 27/32* (2006.01)
  *B32B 27/34* (2006.01)
  *B65D 75/58* (2006.01)

(52) U.S. Cl.
  CPC ............ *B32B 27/18* (2013.01); *B32B 27/306* (2013.01); *B32B 27/32* (2013.01); *B32B 27/34* (2013.01); *B65D 75/5805* (2013.01); *B32B 2307/732* (2013.01); *B32B 2307/75* (2013.01); *B32B 2439/46* (2013.01)

(58) Field of Classification Search
  CPC ....... B32B 27/306; B32B 27/32; B32B 27/34; B32B 2307/732; B32B 2307/75; B32B 2439/46
  See application file for complete search history.

FLEXIBLE RECYCLABLE PACKAGE

CROSS-REFERENCE TO OTHER APPLICATION

This application claims the benefit of and priority to U.S. Provisional Application No. 63/144,314 filed Feb. 1, 2021, the content of which is hereby incorporated by reference.

FIELD OF THE DISCLOSURE

The present disclosure relates to an improved flexible recyclable multilayer package. More particularly, the present disclosure is directed to an improved recyclable multilayer package that addresses the shortcomings of currently available flexible packaging and containers.

BACKGROUND OF THE INVENTION

Flexible containers manufactured from flexible materials are used across a variety of products and industries. Flexible container products made from such flexible material can be less expensive to make, can use less material, and can be easier to decorate, when compared with conventional rigid containers. However, most such packages lack the recyclability performance necessary for an impactful approach in reducing the environmental footprint.

The recyclability of the flexible packages—specifically polymeric flexible packages—is primarily based on the type of material used in the package. For example, polyethylene terephthalate (PET) is one common recyclable polymer, and is designated by the number "1" according to the common numbering scheme created by the Society of the Plastics Industry (SPI). High-density polyethylene (number "2") and low-density polyethylene (number "4") are other commonly recycled plastics. However, many packages are made from one or more plastic materials, and such packages are difficult for recyclers to handle because the different materials cannot easily be separated into different recycle streams.

Packages made with one or more layers combining a low-density polyethylene layer with a PET layer will be designated with a number for plastic packages that are not easily recyclable. In addition, many materials used to improve performance of otherwise recyclable packages, such as barrier layers made of ethyl vinyl alcohol (EVOH) or nylon, can also contribute to a package not easily being placed into the recycle stream.

Many types of flexible packages exist. Examples of flexible packages that may be useful with the present invention include flexible air frame packages such as those disclosed in U.S. Pat. Nos. 9,682,537 and 9,469,088, and U.S. Provisional Application No. 63/144,314 filed Feb. 1, 2021, the contents of which are incorporated by reference herein in their entirety.

Further, the presence of a PET print layer in the film structure makes the material non-recyclable. There is a dearth of suitable flexible recyclable multilayer film structures that can be used for flexible packaging for various containers while at the same time reducing the substantial amount of plastic being introduced into the environment.

Therefore, there is a market need to develop a sustainable alternative material in the recyclable material packaging industry. More particularly, there is a market need for a substantially nylon-free recyclable multilayer package and a method for manufacturing the same—improved recycle-ready and curbside recyclable plastic packaging material that is compatible with the current technology and manufacturing process.

BRIEF SUMMARY OF THE INVENTION

One object of embodiments of the present invention will be to provide a flexible plastic package suitable for curbside recycling; for example, a package that may be in compliance with recyclability as defined by The Association of Plastic Recyclers (APR). One such embodiment comprises a package manufactured from a material that is substantially free of nylon. Another or a second embodiment comprises a package manufactured from a material using certain optimized ratio of compatibilizers in order to achieve suitable packaging performance and standards for recyclability.

In an aspect of the present disclosure, a substantially nylon-free recyclable multilayer package film structure comprises a polyethylene (PE) base layer having a maximum percentage (in weight) of less than 5% of ethylene vinyl alcohol (EVOH) barrier layer. In the depicted embodiment the percentage of EVOH in weight in the total structure will be defined by the type of EVOH and its percentage of ethylene molecular weight.

In another aspect of the present disclosure, an embodiment of the flexible package comprises a polyethylene (PE) base layer including a certain percentage of polyamide nylon (PA) layer and a ethylene vinyl alcohol (EVOH) barrier layer. In the depicted embodiment, the content of the PA and EVOH will define the amount of compatibilizer to be used in the packaging formulation. Various structures of the embodiment can be manufactured depending on whether the printable layer is a nylon or non-nylon based layer.

Preferred embodiments of the recyclable multilayer package disclosed herein and further detailed below are suitable for curbside compliance, such as in compliance with the industry APR requirements for recyclability. In addition, the improved recyclable multilayer packages which are either substantially free of nylon or optimized using various amounts of compatibilizer can be manufactured using conventional equipment and can be used for manufacturing flexible containers. Finally, the recyclable flexible package manufactured from such materials can be designated with a number commonly used for widely available recycle streams.

The references shown above are provided by way of explanation of the invention, not limitation of the invention. It will be apparent to those skilled in the art that various modifications and variations can be made in the present invention without departing from the scope or spirit of the invention. The features illustrated or described as part of one embodiment can be used on another embodiment to yield a still further embodiment. Thus, it is intended that the present invention cover such modifications and variations as come within the scope of the appended claims and their equivalents. Other objects, features and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

BRIEF DESCRIPTION OF THE DRAWINGS

The disclosure will be more readily understood in view of the following description when accompanied by the below figures and wherein like reference numerals represent the elements, wherein.

Figure 1:
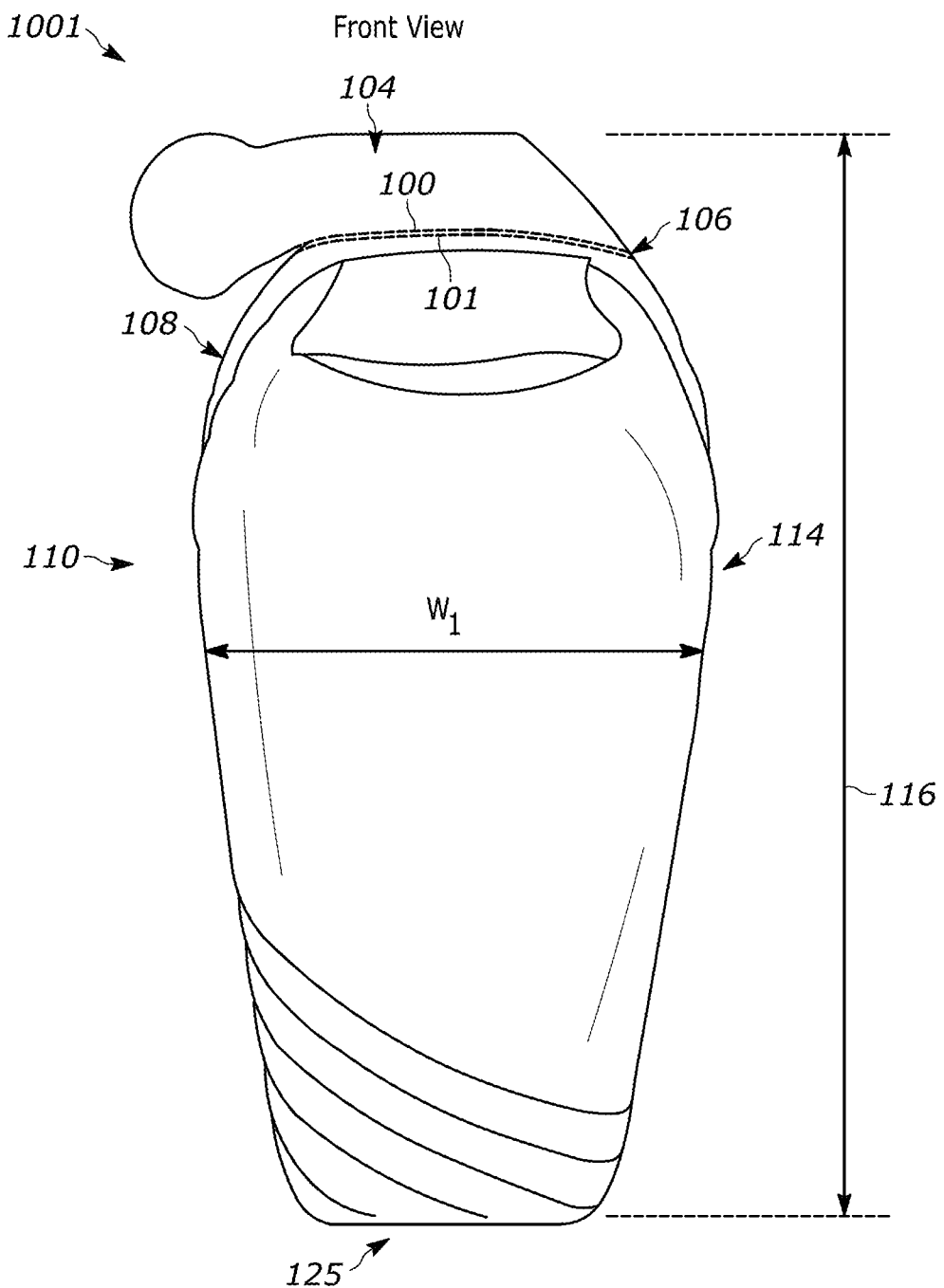
FIG. 1 illustrates a front view of a flexible container manufactured using the nylon-free recyclable multilayer package according to one aspect of the present disclosure.

The accompanying drawings incorporated in and forming a part of the specification illustrate several aspects of the present disclosure and, together with the description, serve to explain the principles of the embodiments. Together with the description, the drawings serve to explain the principles of the invention. The detailed description and the examples described therein have been presented for the purposes of illustration and description only and not by limitation. It is therefore contemplated that the present disclosure covers any and all modifications, variations or equivalents that fall within the spirit and scope of the basic underlying principles disclosed above and claimed herein.

DETAILED DESCRIPTION OF THE INVENTION

The following disclosure as a whole may be best understood by reference to the provided detailed description when read in conjunction with the accompanying drawings, drawing description, abstract, background, field of the disclosure and associated headings. The purpose and advantages of the present invention will be set forth in and apparent from the description that follows, as well as will be learned by practice of the invention. Identical reference numerals when found on different figures identify the same elements or a functionally equivalent element. The elements listed in the abstract are not referenced but nevertheless refer by association to the elements of the detailed description and associated disclosure.

In an aspect of the present disclosure, an improved nylon-free recyclable multilayer package and a method for manufacturing the same is provided that addresses the shortcomings of currently available recyclable materials for flexible packaging and containers.

In an aspect of the present disclosure, a substantially nylon-free recyclable multilayer package film structure comprises a polyethylene (PE) base layer having a maximum percentage (in weight) of less than 5% of ethylene vinyl alcohol (EVOH) barrier layer. In the depicted embodiment the percentage of EVOH (in weight) in the total structure will be defined by the type of EVOH and its percentage of ethylene molecular weight. The improved recyclable multilayer film structure, as disclosed herein, is recyclable under industry-standard recyclability guidelines as long as the EVOH does not exceed 5%.

The substantially nylon-free recyclable multilayer package film structure comprises a first laminate film and a second laminate film joined to at least a portion of the first laminate film by at least one seal. The first laminate film includes a first gas barrier layer disposed between a first sealable layer and a second sealable layer, wherein the first and second sealable layers define opposed exterior layers of the first laminate film. The second laminate film also includes a first gas barrier layer disposed between first and second sealable layers, wherein the first and second sealable layers define opposed exterior layers of the second laminate film.

The first laminate film can further include, in order, a first sealable polyethylene (PE) layer with low initial seal band, a second sealable polyethylene having a certain pre-determined thickness, a first tie layer, a first gas barrier layer of ethylene vinyl alcohol (EVOH), a second tie layer, a second sealable polyethylene (PE) layer and a third sealable polyethylene layer. The second laminate film can further include, in order, a first sealable polyethylene (PE) layer with low initial seal band, a second sealable polyethylene having a certain pre-determined thickness, a first tie layer, a first gas barrier layer of ethylene vinyl alcohol (EVOH), a second tie layer, a second sealable polyethylene (PE) layer and a third sealable polyethylene layer.

In an aspect of the present disclosure, the first laminate film comprises, in order: (1) a first sealable layer of polyethylene (PE) with a thickness of around 28 microns; (2) a second sealable layer of PE having a thickness of around 15 microns; (3) a first tie layer having a thickness of around five microns; (4) a first gas barrier layer of ethylene vinyl alcohol (EVOH) layer, the EVOH layer including 3.9% weight content of ethylene with a thickness of around three microns; (5) a second tie layer having a thickness of around five microns; (6) a second sealable layer of PE having a thickness of around 15 microns; and (7) a third sealable layer of PE having a thickness of around 29 microns. As disclosed herein, the first laminate film, which can also be referred to as an inner laminate film, is suitable for laser treatment and not for corona treatment. In the depicted embodiment, the first laminate film has a thickness of 100 microns, weight of 93.20 g/m2, a gas barrier thickness (EVOH) of 3 microns and width of from about 400 mm to about 1500 mm. It is to be noted that different types of PE layers can be used as sealable layers of the first laminate film for the improved nylon-free recyclable multilayer package.

In yet another aspect of the present disclosure, the second laminate film comprises, in order: (1) a first sealable layer of polyethylene (PE) with a thickness of around 28 microns; (2) a first sealable layer of PE with a thickness of around 15 microns; (3) a first tie layer with a thickness of around five microns; (4) a first gas barrier layer of ethylene vinyl alcohol (EVOH) layer, the EVOH layer including 3.9% weight content of ethylene with a thickness of around three microns; (5) a first tie layer with a thickness of around five microns; (6) a second sealable layer of PE with a thickness of around 15 microns; and (7) a third sealable layer of PE with a thickness of around 28 microns. As disclosed herein, the second laminate film can also be referred to as an outer laminate film suitable for laser and corona treatment. In the depicted embodiment, the second laminate film has a thickness of 100 microns, weight of 93.80 g/m2, a gas barrier thickness (EVOH) of 3 microns and width of from about 400 mm to about 1500 mm. It is to be noted that different types of PE layers can be used as sealable layers of the first laminate film for the improved nylon-free recyclable multilayer package.

In the improved substantially nylon-free recyclable multilayer package disclosed herein, the second laminate film has a construction different from the first laminate film and the lamination strength of the films can be further increased by using a tie or adhesive layer during manufacturing of the film. The lamination strength can be tailored by selection of the type of tie layer as well as the thickness of the tie layer. Where higher lamination strengths are desired, the tie layer can have an increased thickness. In addition, as further disclosed in this detailed description, the lamination strength can be tailored by selection of the type of tie layer as well as the thickness of the tie layer. By way of example and not limitation, a tie layer consisting of an adhesive with a water-based adhesive chemistry and/or thickness of less than two microns can be used where lamination strengths at a low end of the above-described range is desired.

It is to be noted that the layer thickness and total film thickness may vary depending on the package size. For instance, smaller packages may require more caliper in the barrier layer, while bigger sizes require more caliper in strength layers of PE.

In another aspect of the present disclosure, an embodiment of the inventive flexible package comprises a polyethylene (PE) base layer including a certain percentage of polyamide nylon (PA) layer and an ethylene vinyl alcohol (EVOH) barrier layer. In the depicted embodiment, the content of the PA and EVOH will define the amount of compatibilizer to be used in the packaging formulation. A flexible recyclable multilayer film structure is provided comprising a first laminate film and a second laminate film joined to at least a portion of the first laminate film by at least one first seal. The first laminate film can include, in order, a first sealable polyethylene (PE) layer with low initial seal band, a first sealable PE layer with one or more compatibilizers, a first tie layer, a first gas barrier layer of ethylene vinyl alcohol (EVOH), a second tie layer, a second sealable polyethylene (PE) layer having a low initial seal band and including one or more compatibilizers. The flexible recyclable multilayer film structure disclosed herein provided comprising the second laminate can include, in order, a first sealable polyethylene (PE) layer with low initial seal band, a first sealable PE layer with a compatibilizer, a first tie layer, a first gas barrier layer of ethylene vinyl alcohol (EVOH), a second tie layer, a second sealable polyethylene (PE) layer with one or more compatibilizers, a second sealable PE layer and a print layer comprising of recyclable non-PET such as a polyethylene (PE) layer.

In an aspect of the present disclosure, the first laminate film comprises, in order: (1) a first sealable layer of polyethylene (PE) with a thickness of around 28 microns; (2) a second sealable layer of PE having a thickness of around 15 microns; (3) a first tie layer including one or more compatibilizers and having a thickness of around 5 microns; (4) a polyamide nylon layer having a certain thickness; (5) a first gas barrier layer of ethylene vinyl alcohol (EVOH) layer, the EVOH layer including 3.9% weight content of ethylene with a thickness of around 3 microns; (6) a second tie layer including one or more compatibilizers and having a thickness of around 5 microns; (7) a second sealable layer of PE having a thickness of around 15 microns; and (8) a third sealable layer of PE having a thickness of around 29 microns. As disclosed herein, the first laminate film, which can also be referred to as an inner laminate film, may be suitable for laser treatment and not for corona treatment. In the depicted embodiment, the first laminate film has a thickness of 100 microns, weight of 93.20 g/m2, a gas barrier thickness (EVOH) of 3 microns and width of from about 400 mm to about 1500 mm. It is to be noted that different types of PE layers can be used as sealable layers of the first laminate film for the improved nylon-free recyclable multilayer package.

In yet another aspect of the present disclosure, the second laminate film comprises, in order: (1) a first sealable layer of polyethylene (PE) with a thickness of around 28 microns; (2) a first sealable layer of PE with a thickness of around 15 microns; (3) a first tie layer including one or more compatibilizers and with a thickness of around five microns; (4) a polyamide nylon layer having a certain thickness; (5) a first gas barrier layer of ethylene vinyl alcohol (EVOH) layer, the EVOH layer including 3.9% weight content of ethylene with a thickness of around three microns; (6) a second tie layer including one or more compatibilizers and having a thickness of around five microns; (7) a second sealable layer of PE with a thickness of around 15 microns; and (8) a third sealable layer of PE with a thickness of around 28 microns. As disclosed herein, the second laminate film can also be referred to as an outer laminate film suitable for laser and corona treatment. In the depicted embodiment, the second laminate film has a thickness of 100 microns, weight of 93.80 g/m2, a gas barrier thickness (EVOH) of three microns and width of 1,100. It is to be noted that different types of PE layers can be used as sealable layers of the first laminate film for the improved recyclable multilayer package.

In the improved compatibilizer based recyclable multilayer package disclosed herein the second laminate film has a construction different from the first laminate film and the lamination strength of the films can be further increased by using a tie or adhesive layer during manufacturing of the film. The lamination strength can be tailored by selection of the type of tie layer as well as the thickness of the tie layer. Where higher lamination strengths are desired, the tie layer can have an increased thickness. In addition, as further disclosed in the detailed description, the lamination strength can be tailored by selection of the type of tie layer as well as the thickness of the tie layer. By way of example and not limitation, a tie layer consisting of an adhesive with a water-based adhesive chemistry and/or thickness of less than two microns can be used where lamination strengths at a low end of the above-described range is desired.

It is to be noted that the layer thickness and total film thickness may vary depending on the package size. For instance, smaller packages may require more caliper in the barrier layer, while bigger sizes require more caliper in strength layers of PE. Various structures of the embodiment can be manufactured depending on whether the printable layer is a nylon or non-nylon based layer. In the improved recyclable multilayer package disclosed herein the second laminate film has a construction different from the first laminate film and the lamination strength of the films can be further increased by using a tie or adhesive layer during manufacturing of the film. The lamination strength can be tailored by selection of the type of tie layer as well as the thickness of the tie layer. Where higher lamination strengths are desired, the tie layer can have an increased thickness. The lamination strength can be tailored by selection of the type of tie layer as well as the thickness of the tie layer. By way of example and not limitation, a tie layer consisting of an adhesive with a water-based adhesive chemistry and/or thickness of less than two microns can be used where lamination strengths at a low end of the above-described range is desired. By way of example and not of limitation, laser additives and UV inhibitors may be added to some of the PE layer to prevent light sensitivity of such products.

In above-disclosed embodiments where higher lamination strengths are desired, the tie layer can have an increased thickness; for example, about two microns to about five microns, with solvent-based two-part adhesives can be used. Additionally, the tie layer can include polymer tie layers. Tie layers having higher anhydride content, for example, above 150 ppm, in the polymeric layer can also be used to increase lamination strength between two layers of a laminate. Flexible containers having larger-sized structural support volumes may require a flexible material having laminates with higher laminate strength to avoid delamination of the flexible material when formed into a flexible container with expanded structural support volumes.

It is to be noted that containers manufactured using the recyclable multilayer film structure disclosed herein are formed with sufficient structural integrity that can withstand external forces and environmental conditions from handling, without failure. Further, these containers can be configured with structures that allow them to be displayed for sale and put into use, as intended, without any structural issues or failures.

As disclosed herein in one or more aspects of the present disclosure, the term "gas barrier layer" refers to a layer of a laminate of a flexible material, the gas barrier layer being a material or coated material that resists the permeation of gas through the layer. The gas barrier layer imparts at least partial resistance to the permeation of gas through the flexible material. In the depicted embodiments, the gas transmission rate of the EVOH gas barrier layer can be tailored by varying the thickness and mol percentage of ethylene content in the layer. The EVOH gas barrier layer can include from about 24 mol % to about 48 mol % ethylene, with the lower content of ethylene resulting in a gas barrier layer having a lower gas transmission rate. Additionally, the gas transmission rate of the gas barrier layer can be reduced by providing a thicker layer. In addition, the gas transmission rate of a gas barrier layer of EVOH can be tailored by changing the mol percentage of ethylene in the barrier material and/or thickness of the gas barrier layer. In general, an increase in the mol percentage of ethylene in the EVOH will increase the gas transmission rate, while increased thickness of the gas barrier layer will decrease the gas transmission rate.

As disclosed herein in one or more aspects of the present disclosure, the term "print layer" refers to a layer of a laminate of a flexible material, wherein the print layer is a material having at least one major surface that is configured to receive and retain an ink, including a material that is treated in at least a portion in order to have a sufficient surface energy to receive and retain an ink.

In an aspect of the present disclosure, a material can be treated by corona treatment, plasma treatment, laser treatment, and/or oxidation via flame. Exemplary print layer materials include, but are not limited to, papers, oriented and unoriented polyesters, PEF, PBT, PLA, Polyamides, cellulosic or cellulosic esters, PHA, PVC, ionomers, such as a sodium ionomer or a zinc ionomer, thermoplastic starch, polyolefins, including cyclic polyolefins, LLDPE and PP, LDPE, HDPE, MDPE, manufactured using Ziegler-Natta catalysts, chromium catalysts, metallocene-based catalysts, single-site catalysts and other types of catalysts such as homopolymers or copolymers.

As disclosed herein in one or more aspects of the present disclosure, the term "sealable layer" refers to a layer of a laminate of a flexible material, wherein the sealable layer is a material that is configured to be sealed to itself or another sealable layer using any kind of sealing method known in the art, including, for example, heat sealing (e.g., conductive sealing, impulse sealing, ultrasonic sealing, etc.), welding, crimping, bonding, and the like, and/or combinations of any of these methods.

It is to be further noted that various embodiments of the improved flexible multilayer recyclable package formed is substantially free of nylon and is recyclable under industry standard recyclability guidelines as long as the EVOH does not exceed 5%.

In another aspect of the present disclosure, a flexible container configured to have a certain product volume, comprising of one or more of the recyclable multilayer film structures is formed wherein the packaging material forms 50-100% of the overall surface area of the one or more materials that define the three-dimensional space of the product volume of the flexible container. By way of example and not of limitation, the flexible container can be configured to have a product volume wherein one or more flexible materials form a particular percentage of the overall area of the one or more materials that define the three-dimensional space, and the particular percentage is any integer value for percentage between 50% and 100%, or within any other range formed by any of these values, such as: 60-100%, 70-100%, 80-100%, or 90-100%, etc.

Embodiments of the recyclable multilayer film structure used for flexible containers meet standard curbside recycling requirements. An example of standard curbside recycling requirements in the United States is published by the APR as further detailed below. Another example of standard curbside recycling requirements in Europe is promulgated by RecyClass as further detailed below.

In some embodiments, a plastic package is considered "Recyclable per APR Definition" if it satisfies all of the recyclability criteria listed below (as listed at http://plastics-recycling.org/recycling-definitions):

(1) At least 60% of consumers or communities have access to a collection system that accepts the item per the U.S. Federal Trade Commission "Green Guides";

(2) The item must have market value, or be supported by a legislatively mandated program;

(3) The item is most likely sorted correctly into a market-ready bale of a particular plastic meeting industry standard specifications, through commonly used material recovery systems, including single-stream and dual stream systems that handle deposit system containers, grocery store rigid plastic and film collection systems; and (4) The item can be further processed through a typical recycling process cost effectively into a postconsumer plastic feedstock suitable for use in identifiable new products.

Embodiments of recyclable packages of the present invention meet all the functionality and compliance requirements of the APR in accordance with the APR Design Guides for the relevant material. Each aspect of the package designed is evaluated against industry-accepted criteria to ensure that it is truly recycling compatible in accordance with the above criterion.

In order to be recyclable, various embodiments of the polyethylene-based flexible material must meet either the protocols for recyclability under APR Critical Guidance for HDPE rigid containers, or perform no worse under the relevant criteria than LDPE, which is widely accepted as recyclable. Among such criteria is that a polyethylene-based flexible package (without compatibilizers) must have less than or equal to 5% EVOH by weight of the package.

Critical Guidance from the APR relevant to embodiments of the present invention include the following criteria, which are taken from the APR Critical Guidance for HDPE Recyclability:

TABLE A

| PROPERTY (HDPE) | CRITICAL VALUE |
|---|---|
| Melt Index | ASTM D1238: <0.75 g/10 minutes delta to Control HDPE |
| Density | ASTM D792: <1 g/cc for Control HDPE and test |
| Screen Pack Pressure Build | End pressure no greater than 25% over starting pressure value |
| % Volatiles in Pellets | <0.5% |
| % Polypropylene in Pellets | ASTM D7399: <5% PP in test sample B (up to 10% allowable in innovation) |
| DSC | ASTM D3418: Primary Peak not to exceed 150° C. |
| Flexural Modulus | No more than a 25% decrease when compared to the Control HDPE |
| Tensile @ Yield | No more than a 25% delta when compared to the Control HDPE |
| Elongation @ Yield | No more than a 50% decrease when compared to the Control HDPE. All values should be more than 200% |

Embodiments of the present invention meet recyclability requirements because, for each property above, they either meet the requirement for an HDPE package, or measure no worse than the LDPE.

Critical Guidance from RecyClass relevant to embodiments of the present invention include the following criteria, which are taken from the RecyClass Recyclability Evaluation Protocol for HDPE Containers, Version 2.0, published July 2019, and in particular, Pellet Properties Evaluation of RecyClass and the criteria for Bottles Blow Moulding:

TABLE B

| PROPERTY | STANDARD | CRITICAL VALUE |
|---|---|---|
| Bulk Density (kg/m³) | Annex B of EN 15344 | No less than 550 kg/m³ |
| Melt Index (g/10 min) | ISO 1133 (190° C./ 2.16 kg) | Between 0.2 and 0.9 g/10 min |
| Density | ISO-1183-1 | Between 0.941 and 0.970 kg/m³ |
| Ash Content (%) | ISO 3451-1 (muffle) or ISO 11358 (TGA) | A.50 lower than 2% |
| % Volatiles in Pellets | 10 g air-dried pellets exposed to 160° C. for 10 minutes | +/−0.1% for A.25 and A.50 respect to A.0 |
| % Polypropylene in Pellets | Differential Scanning Calorimetry or optionally Spectroscopic measurement via FTIR microscope in case of doubt | No more than 2% for A.25 and A.50 |
| DSC | ISO 11357-3 | Melting point 130-140° C. |
| Stress @ Yield | ISO 527-2 | No more than −25% delta to control |
| Stress @ Break | ISO 527-2 | No more than −25% delta to control |
| Elongation @ Yield | ISO 527-2 | No more than −25% delta to control |
| Elongation @ Break | ISO 527-2 | No more than −25% delta to control |
| Strength | ISO 527-2 | No more than −25% delta to control |
| Elongation @ Strength | ISO 527-2 | No more than −25% delta to control |

Other third parties, for example, Interseroh Zero Waste Solutions of Cologne, Germany, also promulgate generally accepted recyclability criteria relevant to embodiments of the present invention.

Embodiments of the present invention will be considered to meet recyclability requirements for curbside recycling when it meets or exceeds generally accepted standards of recyclability for rigid polyethylene containers, for example, if it meets the relevant standards of a rigid HDPE container or, if the package does not meet a particular measured criteria for rigid HDPE, alternatively is no worse under that same measured property as LDPE.

In addition, embodiments of flexible packages made using the recyclable multi-layer film structures disclosed herein are suitable for consumer packaging. In particular, such packages will meet one or more of the following performance criteria:

TABLE C

| COMPLIANCE REQUIREMENT FOR RECYCLE READY MATERIALS | | EVALUATION CRITERIA |
|---|---|---|
| At least Parity Package Performance vs. control Tested at 24 h through 24 months | Opening | Pull tab opening force <30 N |
| | Valve Performance | Force to dose <7 lbf |
| | | Clean Cut of product string from valve |
| | | Open Valve Leak test <1 g Venting up to emptying |
| | Tilt Angle | >9 degree (side to side, front to back) |
| | Leak Proof | No leak of product and air pressure within range after 10 lb-leak test pass lever test |
| | | No leaks of product and air pressure within range after drop test @ 4 feet (6 drops, one per pack side) |
| | Inflation Pressure Range | Max: up to 14 psi Min: valve performs |
| | Accelerated Stability Test at 40° C./50% RH, 8 weeks | Weight loss <1.5% (with control product) No delamination and/ or layer separation No product leakage No seal failures Air Pressure (min): valve performs |

In another aspect of the present disclosure, a "flexible container" refers to a container configured to have a product volume wherein one or more flexible improved nylon-free recyclable multilayer packaging materials form 50-100% of the overall surface area that defines the three-dimensional space of the product volume.

In yet another aspect of the present disclosure, a flexible container manufactured from the improved nylon-free recyclable multilayer package generally refers to a thin, easily deformable, sheet-like material, having a flexibility factor within a certain range, for instance between 1,000-2,500,000 N/m.

As further disclosed herein, flexible containers manufactured from the improved nylon-free recyclable multilayer material, can be configured to have a flexibility factor that falls within a certain range. For instance, the flexibility factor of an improved nylon-free recyclable multilayer package can range from 1,000-2,500,000 N/m, or have any integer value for flexibility factor from 1,000-1,500,000 N/m, 1,500-1,000,000 N/m, 2,500-800,000 N/m, 5,000-700,000 N/m, 10,000-600,000 N/m, 15,000-500,000 N/m, 20,000-400,000 N/m, 25,000-300,000 N/m, 30,000-200,000 N/m, 35,000-100,000 N/m, 40,000-90,000 N/m or 45,000-85,000 N/m.

In another aspect of the present disclosure, a flexible recyclable package material or film comprises a first laminate film further comprising, in order: a first sealable polyethylene layer with low initial seal band defining an exterior layer of the first laminate and a second sealable polyethylene layer having a certain pre-determined thickness. In the depicted embodiment, the second sealable polyethylene layer comprises a compatibilizer; a first tie layer; a third sealable layer; a first gas barrier layer of ethylene vinyl alcohol (EVOH); a fourth sealable layer; a second tie layer; a fourth sealable polyethylene layer having a certain pre-determined thickness, wherein the fourth sealable polyethylene layer comprises a compatibilizer; a fifth sealable polyethylene layer.

In yet another aspect of the present disclosure, a flexible recyclable package material or film comprises a second laminate film comprising, in order: a first sealable polyethylene layer with low initial seal band defining an exterior layer of the second laminate. It is to be noted that the package further comprises a second sealable polyethylene layer having a certain pre-determined thickness; wherein the second sealable polyethylene layer comprises a compatibilizer; a first tie layer; a third sealable layer; a first gas barrier layer of ethylene vinyl alcohol (EVOH); a fourth sealable layer; a second tie layer; a fourth sealable polyethylene layer having a certain pre-determined thickness; and wherein the fourth sealable polyethylene layer comprises a compatibilizer; a fifth sealable polyethylene layer.

In another aspect of the present disclosure, the above-referenced embodiments of the multilayer flexible recyclable packaging material can be manufactured with varying amounts of compatibilizer thereby improving the bonding and the sealing strength of the finished product. The flexible nylon-free recyclable packaging material or film can be manufactured with 5% or 8% compatibilizer content wherein the improved bonding strength and sealing strength of the multilayer finished product will be closer to the original material or the film used in manufacturing.

It is to be noted that the compatibilizer is used primarily to promote enhanced adhesion between polyolefins and polar polymers such as ethylene vinyl alcohol (EVOH), polyamide and other blends of polar polymers. By way of example and not of limitation, the compatibilizer used in the various embodiments of this invention can be a Dow-branded compatibilizer such as the Dow RETAIN™ Polymer Modifier.

The recyclable film formulations disclosed above can be formed by iteratively selecting various amounts of compatibilizers to find the right balance of synergistic performance and/or reduced expense of manufacturing the film structure for the flexible packaging. The table below shows the various compatibilizer compositions based on two different types of compatibilizers and dependent on film composition: Ampacet's ReVive™ (Compatibilizer No. 1) and Dow's RETAIN™ (Compatibilizer No. 2) compatibilizers. The amount of compatibilizer listed is an approximate amount.

TABLE D

| BASIC FILM COMPOSITION | COMPATIBILIZER NO. 1 | COMPATIBILIZER NO. 2 |
|---|---|---|
| PE, Nylon and EVOH | 1% | 14-20% |
| PE, Nylon and EVOH | 2% | 12-15% |
| PE, Nylon and EVOH | 3% | 11-15% |
| PE, Nylon and EVOH | 4% | 8-15% |
| PE, Nylon and EVOH | 5% | 8-15% |
| PE and EVOH (substantially free of nylon) | 1% | 14-20% |
| PE and EVOH (substantially free of nylon) | 2% | 12-15% |
| PE and EVOH (substantially free of nylon) | 3% | 11-15% |
| PE and EVOH (substantially free of nylon) | 4% | 8-15% |
| PE and EVOH (substantially free of nylon) | 5% | 8-15% |

In another aspect of the present disclosure, a flexible recyclable package is provided. In the depicted embodiment, the flexible recyclable package comprises a multilayer package substantially free of nylon and recyclable under industry-standard recyclability guidelines, wherein at least a portion of the first sealable layer of the second laminate joins to at least a portion of the fifth sealable polyethylene layer of the first laminate to form at least one joined sealed portion. The flexible packaging structure is formed such that at least one joined sealed portion defines at least one boundary of a structural support volume disposed between the first and second laminates. By way of example and not of limitation, the flexible recyclable packaging material has a thickness of 100 microns, weight in the range of 95.85-95.26 g/m2, a gas barrier thickness (EVOH) of 8 microns PA per 8 microns and a width of from about 400 mm to about 1500 mm.

Figure 2:
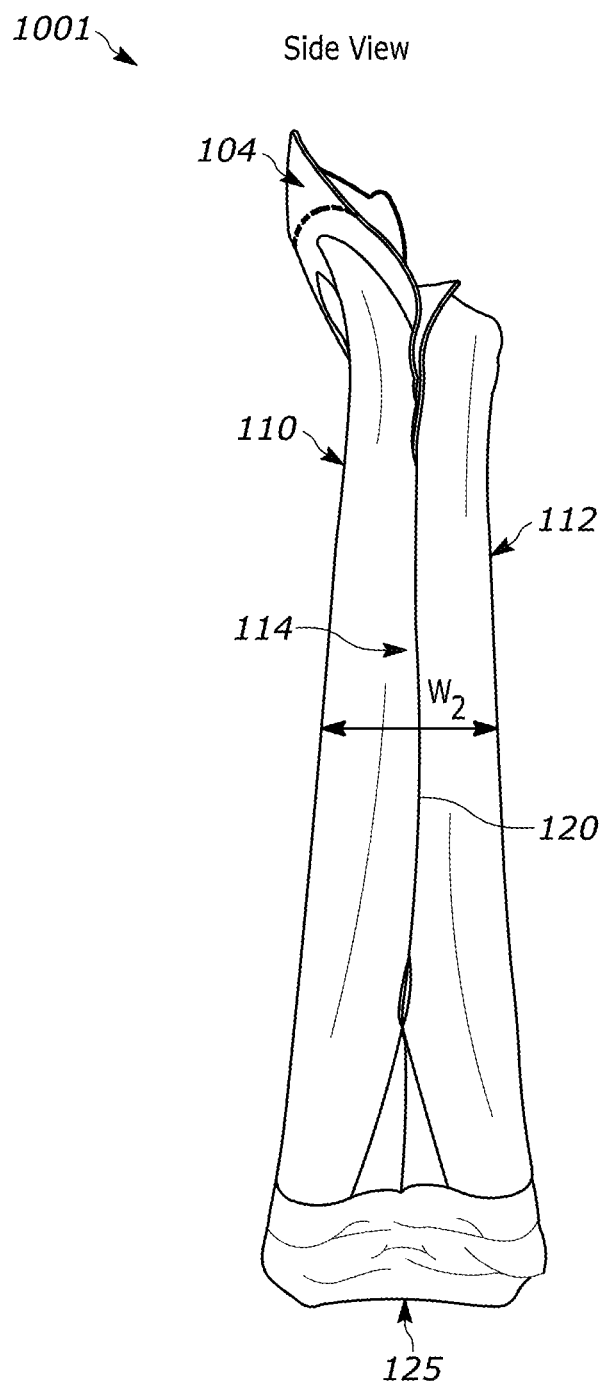
FIG. 2 illustrates a side view of the flexible container of FIG. 1 according to one aspect of the present disclosure.
Figure 3:
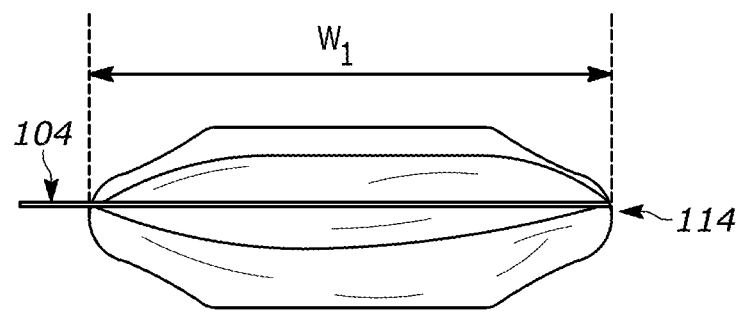
FIG. 3 illustrates a top view of the flexible container of FIG. 1 according to one aspect of the present disclosure.
Figure 4:
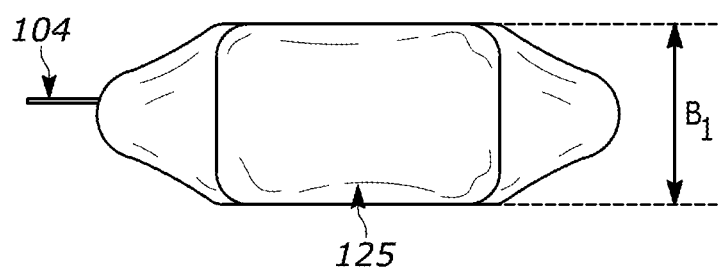
FIG. 4 illustrates a bottom view of the flexible container of FIG. 1 according to one aspect of the present disclosure.

Flexible containers manufactured from the material disclosed herein can be used across a variety of products and industries. FIG. 1 illustrates a front view of a flexible container manufactured using an embodiment of the flexible material. FIG. 2 illustrates a side view of the flexible container of FIG. 1. FIG. 3 illustrates a top view of the flexible container of FIG. 1. FIG. 4 illustrates a bottom view of the flexible container of FIG. 1.

As illustrated in FIGS. 1 through 4, flexible container 1001 manufactured using an embodiment of the flexible material includes a tear-off top 104, a middle line of weakness, such as a score or perforation 106, and a bottom product containing portion 108, the front 110, the back 112, and left and right sides 114. The top 104 is separated from the middle 106 by a reference plane 100, which is parallel to the XZ plane. The middle 106 is separated from the bottom 108 by a reference plane 101, which is also parallel to the XZ plane. The container 1001 has an overall height 116. In the embodiment, the front 110 and the back 112 of the container are joined together at a seal 120, which extends around the outer periphery of the container 1001, across the top 104, down the side 114, and then, at the bottom of each side 114, splits outward to follow the front and back portions of the base 125, around their outer extents.

Further, as shown in more detail in FIGS. 1 and 2, the tear-off top 104 is torn off by a user to access a valve, an example of which is disclosed in U.S. Pat. Nos. 9,694,965 and 10,138,049, especially FIGS. 16 and 18 thereof, the entirety of both patents being incorporated herein by reference. Properties of the valve consistent with the present invention are described further below.

Figure 5:
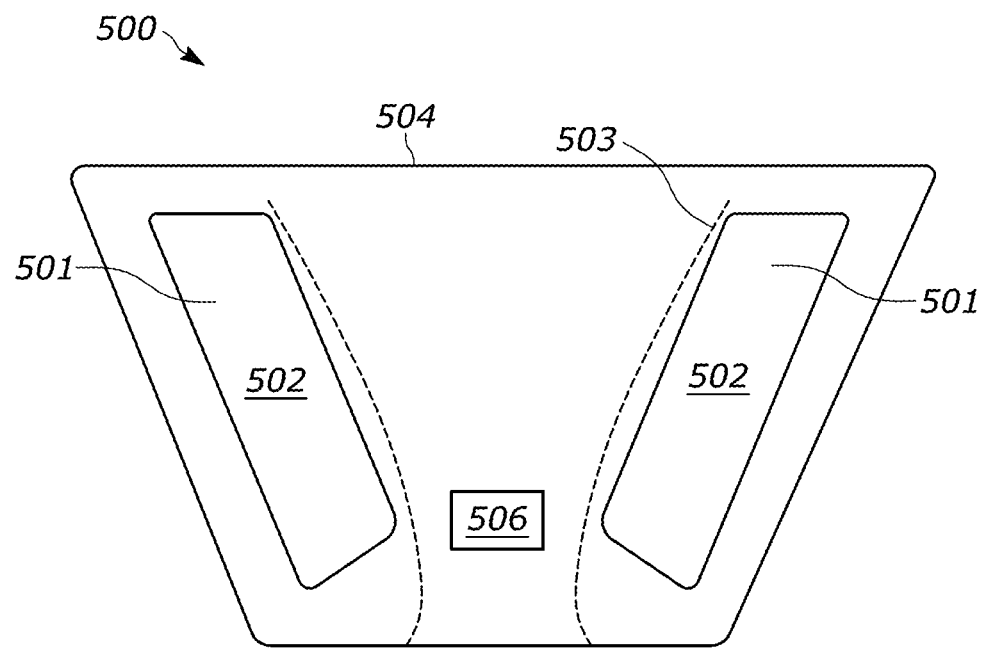
FIG. 5 illustrates a schematic view of an embodiment of a valve structure useful in connection with the present invention.

A valve according to an embodiment of the invention, described with reference to FIG. 5. FIG. 5, illustrates a top view of a flexible valve 500 comprising two tension-inducing elements 501 opposed from one another, which are expandable volumes 502, and a flow path 503. Fluent product enters the flow path 503 through the inlet 504 and exits the flow path 503 through the outlet 505 when a critical squeeze force is applied and the flexible valve 500 opens.

When the critical squeeze force is released and the flexible valve 500 closes, a tension gradient in the flow path 503 creates a suck-back effect such that fluent product in the flow path 503 reverses its direction of travel to migrate back through the inlet 504. An indicator 506 located on the flow path 503 cues a user as to whether the flexible valve 500 is open or closed. Flexible material forms the flow path 503. The tension-inducing elements 501 may hold the flexible material forming the flow path 503 at a fixed position when a critical squeeze force is applied so that fluent product can be dispensed. In some embodiments, the flexible material forming the flow path 503 between the tension-inducing elements 501 may curve upward or downward relative to the two tension-inducing elements 501. The flexible material forming the flow path 503 in some embodiments should be relatively flat and in some embodiments does not have crooks or bends that block the flow path 503.

The width of the outlet 505 strongly affects what the critical squeeze force is. The smaller the width of the outlet 505, the greater the critical squeeze force is. The stiffness of the flexible material forming the flow path 503 should also be adjusted to help achieve the desired critical squeeze force. The shape, size, relative orientation, and pressure of the tension-inducing elements 501 affect the critical squeeze force and mass flow rate achievable through the flexible valve 500. The mass flow rate through the flexible valve 500 of fluent product and the critical squeeze force of the flexible valve 500 are also adjustable through manipulation of the container comprising the flexible valve 500. Numerous parameters of the materials forming the container, the geometry and arrangement of the tension-inducing elements 501 (e.g., separation distance, shape, size), the size, shape, and width of seals used to create expandable volumes, and the fluid properties of the fluent product impact the performance and optimization of the flexible valve 500. The inlet 504 and the outlet 505 can have different sizes, leading to a flow channel that is non-rectangular. For example, the flow path 503 can be trapezoidal or any other suitable type of profile shape. The angle at which the flow path 503 constricts fluent product flow can be any value, for example 0, 40, 60, or 75 degrees. The size and shape of each expandable volume 502 can be constant or variable. For example, each expandable volume 502 can have a width at a largest point of about 0.1 inches to about 1.5 inches, or any range therein such as about 0.1 inches to about 1.1 inches, about 0.3 inches to about 0.4 inches, or about 1.1 inches to about 1.5 inches. The opening of the outlet 505 can have a width ranging from about 0.2 inches to about 1 inch, or any range therein such as about 0.3 inches to about 0.8 inches, about 0.6 inches to about 0.9 inches, or about 0.2 inches to about 0.25 inches. The mass of fluent product dispensed can be about 0.1 g to about 100 g, or any range therein such as about 0.5 g to about 10 g, about 56 g to about 99 g, or about 2 g to about 43 g. The critical squeeze force can be from about 0.1 N to about 550 N, or any range therein such as about 0.5 N to about 110 N, about 125 N to about 130 N, or about 500 N to about 540 N. The impulse before dispense (N*s) can range from about 1 N s to about 1000 N s and is calculated as the area under the force vs. time curve before any mass flow rate begins. The impulse to dispense (N*s) can range from about 1 N s to about 1500 N s and is calculated as the area under the force vs. time curve during dispensing. The total effort to dispense (N*s/g) can range from about 1 to about 1200 N s/g and is calculated from adding the impulse before and during dispense and dividing by the amount of mass dispensed.

Figure 6:
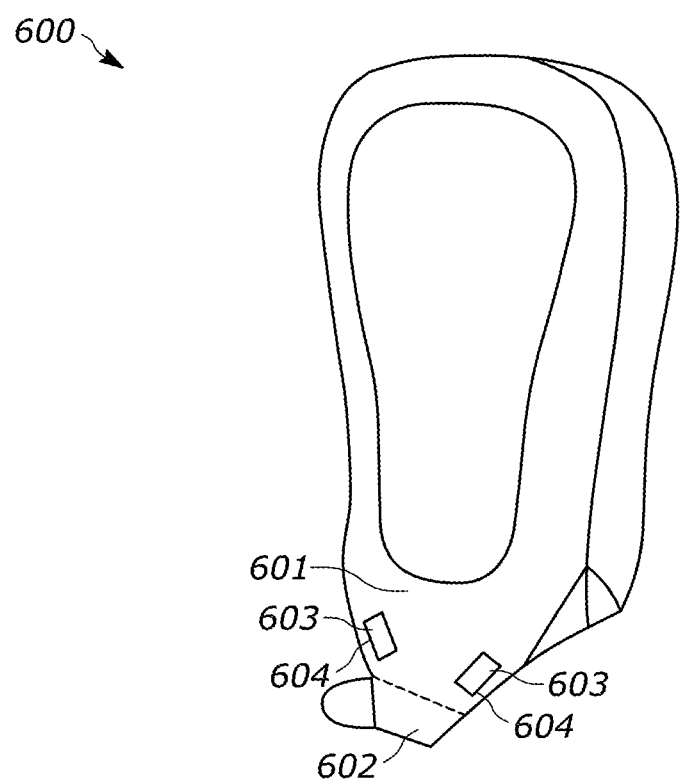
FIG. 6 illustrates an elevated embodiment of a package including the valve of FIG. 5.

FIG. 6 illustrates an isometric view of a container 600 comprising a flexible valve 601 having an initial hermetic seal 602. The initial hermetic seal 602 depicted in FIG. 6 is a tear-off top. The tear off top may have any suitable shape to aid a consumer in handling, gripping, and removing the hermetic seal 602. The hermetic seal 602 may include artwork and be suitably shaped to compliment the package design. The hermetic seal 602 may also include a sensory-experience sampling mechanism (not pictured). The flexible valve 601 further comprises two tension-inducing elements 603 that are expandable volumes 604.

Flexible containers manufactured from the recyclable material disclosed herein should be configured with sufficient structural integrity, such that it can be handled in many ways by consumers, or in any other way known in the art, as intended, without failure. For instance, self-supporting flexible containers having product volumes and structural support volumes can be manufactured with a flexible valve mechanism to facilitate dispensing fluid product from the product support volume. One or more tension-inducing elements may be used to provide the flexible valves with the ability to permit dispensing of fluid product from the product volume upon application of greater than a minimum threshold but less than a maximum threshold of squeeze force to an exterior of the flexible container manufactured from the flexible packaging material disclosed herein. The flexible valve may also be re-closable to prevent fluid product from being dispensed subsequent to use.

Examples of flexible packages that may be useful with the present invention include flexible air frame packages such as those disclosed in U.S. Pat. Nos. 9,682,537 and 9,469,088, which are incorporated by reference herein in their entirety. In such packages, a first laminate film and second laminate film are sealed to each other to create a product chamber. The first laminate film and the second laminate film are sealed to each other in areas to form air pockets to provide a rigid three-dimensional air frame to the package in an empty state.

As disclosed herein, the term "valve" refers to a mechanism for selectively dispensing a product contained in the flexible container. For example, a valve may comprise a portion that has undergone activation, a flow path comprising tension-inducing elements such as expandable volumes, and/or other structures that prevent product from being dispensed when a force less than the critical squeeze force is applied to the container and a pressure less than the critical pressure buildup exists inside the product volume, yet allows product to be dispensed when the force applied to the container exceeds the critical squeeze force or the pressure inside the product volume exceeds the critical pressure buildup. A valve may further comprise an indicator that creates a signal to inform users as to whether the valve is open or closed. Embodiments of an integral valve may include a tab with a required tear open force to gain access to the contents of the package. Embodiments of a valve suitable for the present invention are disclosed in U.S. Pat. Nos. 9,694,965 and 10,138,049, which are incorporated by reference herein in their entirety.

As used herein, the term "critical pressure buildup" refers to a pressure sufficient to cause product to be dispensed when such a pressure occurs within the product volume and is thus exerted on the valve. For example, a critical pressure buildup that would be acceptable to consumers would be in the range of about 0 Pa to about 90,000 Pa gauge pressure, or any range formed by these values such as about 10,000 Pa to about 60,000 Pa, about 25,500 Pa to about 90,000 Pa, or about 2 Pa to about 4562 Pa. Pressure values referred herein are gauge pressures, or pressure measured above atmospheric pressure. The critical pressure buildup is not dependent upon container materials, container shape, or location where a force is applied to the container.

As used herein, the term "critical squeeze force" refers to a force sufficient to cause product to be dispensed from the container when such force is applied to the container. For example, a critical squeeze force that would be acceptable to consumers would be in the range of about 0.1 N to about 550 N, or any range formed by these values such as about 0.15 N to about 470 N, about 5 N to about 230 N, about 55 N to about 549 N, about 0.5 N to about 4 N, about 4 N to about 8 N, about 40 N to about 240 N, about 410 N to about 475 N, about 10 N to about 530 N, about 100 N to about 200 N, about 250 N to about 300 N, or about 400 to about 500 N. The critical squeeze force is dependent upon the container materials, the container shape, and the location where the force is applied.

The use of the terms "a", "an" and "the" and similar referents in the context of describing the invention (especially in the context of the following claims) is to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted.

The recitation of ranges of values herein is merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Various embodiments of the present invention meet both the performance criteria and recyclability criteria. A first embodiment comprises a plastic air frame package with integral valve of the form depicted in FIG. 1 having the following multilayer structure:

TABLE E

| STRUCTURE I | |
|---|---|
| OUTER LAYER | Printable PE layer #1 |
| | adhesive lamination |
| | PE base layer #2 |
| | PE base layer #3, and/or #4 and/or # 5 |
| | tie layer |
| | EVOH |
| | tie layer |
| | PE base layer #3, and/or #4 and/or # 5 |
| | PE base layer #2 |
| | AIR CHAMBER |
| INNER LAYER | PE base layer #6 |
| | PE base layer #7, and/or #8 and/or # 9 |
| | tie layer |
| | EVOH |
| | tie layer |
| | PE base layer #7, and/or #8 and/or # 9 |
| | PE base layer #6 |
| | PRODUCT CHAMBER |
| INNER LAYER | PE base layer #6 |
| | PE base layer #7, and/or #8 and/or # 9 |

TABLE E-continued

| STRUCTURE I | |
|---|---|
| | tie layer |
| | EVOH |
| | tie layer |
| | PE base layer #7, and/or #8 and/or # 9 |
| | PE base layer #6 |
| | AIR CHAMBER |
| OUTER LAYER | PE base layer #2 |
| | PE base layer #3, and/or #4 and/or # 5 |
| | tie layer |
| | EVOH |
| | tie layer |
| | PE base layer #3, and/or #4 and/or # 5 |
| | PE base layer #2 |
| | adhesive lamination |
| | Printable PE layer #1 |

An embodiment of Structure I meets both the performance criteria and recyclability criteria. The PE layers of Structure I may be low-density PE, medium-density PE, or high-density PE. The thickness of the individual layers may be from 0.002 mm to 0.075, depending on the layer. Structure I is substantially free of nylon.

A second embodiment comprises a plastic air frame package with integral valve of the form depicted in FIG. 1 having the following multilayer structure:

TABLE F

| STRUCTURE II | |
|---|---|
| OUTER LAYER | Printable PE layer #1 |
| | adhesive lamination |
| | PE base layer #2, and/or #3, and/or #4 |
| | tie layer and compatibilizer |
| | PA (Nylon) |
| | EVOH |
| | PA (Nylon) |
| | tie layer and compatibilizer |
| | PE base layer #2, and/or #3, and/or #4 |
| | AIR CHAMBER |
| INNER LAYER | PE base layer #6, and/or #7, and/or #8 |
| | tie layer and compatibilizer |
| | PA (Nylon) |
| | EVOH |
| | PA (Nylon) |
| | tie layer and compatibilizer |
| | PE base layer #6, and/or #7, and/or #8 |
| | PRODUCT CHAMBER |
| INNER LAYER | PE base layer #6, and/or #7, and/or #8 |
| | tie layer and compatibilizer |
| | PA (Nylon) |
| | EVOH |
| | PA (Nylon) |
| | tie layer and compatibilizer |
| | PE base layer #6, and/or #7, and/or #8 |
| | AIR CHAMBER |
| OUTER LAYER | PE base layer #2, and/or #3, and/or #4 |
| | tie layer and compatibilizer |
| | PA (Nylon) |
| | EVOH |
| | PA (Nylon) |
| | tie layer and compatibilizer |
| | PE base layer #2, and/or #3, and/or #4 |
| | adhesive lamination |
| | Printable PE layer #1 |

An embodiment of Structure II meets both the performance criteria and recyclability criteria. The PE layers of Structure II may be low-density PE, medium-density PE, or high-density PE. The thickness of the individual layers may be from 0.002 mm to 0.075, depending on the layer. Structure II contains one or more compatibilizers. The compatibilizers may alternatively be in one or more of the PE layers, or in the PA (nylon) layers. The compatibilizers may be the compatibilizers shown in Table D in the ratios recited in Table D.

A third embodiment was created comprising a plastic air frame package with integral valve of the form depicted in FIG. 1 having the following multilayer structure:

TABLE G

STRUCTURE III

| | |
|---|---|
| OUTER LAYER | PA (nylon) printable layer |
| | adhesive lamination |
| | PE base layer #2, and/or #3, and/or #4 |
| | tie layer and compatibilizer |
| | EVOH |
| | tie layer and compatibilizer |
| | PE base layer #2, and/or #3, and/or #4 |
| | AIR CHAMBER |
| INNER LAYER | PE base layer #6, and/or #7, and/or #8 |
| | tie layer and compatibilizer |
| | EVOH |
| | tie layer and compatibilizer |
| | PE base layer #6, and/or #7, and/or #8 |
| | PRODUCT CHAMBER |
| INNER LAYER | PE base layer #6, and/or #7, and/or #8 |
| | tie layer and compatibilizer |
| | EVOH |
| | tie layer and compatibilizer |
| | PE base layer #6, and/or #7, and/or #8 |
| | AIR CHAMBER |
| OUTER LAYER | PE base layer #2, and/or #3, and/or #4 |
| | tie layer and compatibilizer |
| | EVOH |
| | tie layer and compatibilizer |
| | PE base layer #2, and/or #3, and/or #4 |
| | adhesive lamination |
| | Printable PA (Nylon) layer |

An embodiment of Structure III meets both the performance criteria and recyclability criteria. The PE layers of Structure III may be low-density PE, medium-density PE, or high-density PE. The thickness of the individual layers may be from 0.002 mm to 0.075, depending on the layer. Structure III contains one or more compatibilizers. The compatibilizers may alternatively be in one or more of the PE layers, or in the PA (nylon) layers. The compatibilizers may be the compatibilizers shown in Table D in the ratios recited in Table D.

Embodiments of the invention are suitable for consumer packaging by virtue of their compliance with the performance criteria of Table C. Furthermore, the novel composition and package-meets-recyclability criteria for PE packaging, such as the criteria in Table A or Table B. Additionally, the package is uniquely recyclable in a curbside recycling model for additional reasons that the present package is easily sortable as a three-dimensional package by virtue of its air frame construction, and therefore can be easily visually and mechanically removed from the recycle stream of two dimensional films. Unlike typical recyclable polyethylene flexible packaging, which is constructed as a pouch that, when empty, collapses to approximately two dimensions, the novel material properties combined with the air frame construction yields a three-dimensional flexible polyethylene-based package that meets performance and recyclability criteria, and is easily incorporated into community recycling programs. An additional advantage of those embodiments is the integral resealable valve that does not utilize separate parts and spouts that must be removed or disassembled in the recycle stream. The present invention overcomes the performance and recyclability issues in current flexible packages, including current air frame flexible packages. Finally, unlike "clean and dry" grocery bags or dried food pouches, which can be dropped off at store collection systems, liquid packaging will always be "wet and dry" packages not accepted in any store collection systems. The present invention overcomes such issues in current flexible packages, including current air frame flexible packages, by making the "wet and dry" packages curbside recyclable.

It is understood that the preceding is merely a detailed description of some examples and embodiments of the present disclosure, and that numerous changes to the disclosed embodiments may be made in accordance with the disclosure made herein without departing from the spirit or scope of the disclosure. The preceding description, therefore, is not meant to limit the scope of the disclosure, but to provide sufficient disclosure to allow one of ordinary skill in the art to practice the disclosure without undue burden. The scope of the present disclosure fully encompasses other embodiments that may become obvious to those skilled in the art. Features illustrated or described as part of one embodiment can be used in another embodiment to yield a still further embodiment. Thus, it is intended that the present disclosure cover such modifications and variations as come within the scope of the appended claims and their equivalents. It is to be understood by one of ordinary skill in the art that the present discussion is a description of exemplary embodiments only, and is not intended as limiting the broader aspects of the present disclosure, which broader aspects are embodied in the exemplary constructions.

The invention claimed is:
1. A flexible recyclable package comprising:
a first laminate film comprising one or more layers of polyethylene, one or more layers of EVOH, one or more tie layers, and one or more adhesive layers, wherein an outer layer of the first laminate film is a printable polyethylene layer;
a second laminate film comprising one or more layers of polyethylene, one or more layers of EVOH, one or more tie layers, and one or more adhesive layers;
wherein the first laminate film and second laminate film are sealed to each other to create a product chamber;
wherein the first laminate film and the second laminate film are sealed to each other in areas to form air pockets to provide a rigid three-dimensional air frame to the package in an empty state;
wherein the amount EVOH in the package by weight is less than or equal to 5% of the package;
wherein the package is substantially free of nylon; and
wherein the package meets recyclability criteria for curbside recycling.
2. The flexible recyclable package of claim 1, wherein the seal between the first and second laminate films has a seal strength of 40 N/25 mm to about 140 N/25 mm.
3. The flexible recyclable package of claim 1, wherein the layers comprising each of the first and second laminate films have a lamination strength between such layers of about 10 N/25 mm to about 20 N/25 mm.
4. A flexible recyclable package comprising:
a first laminate film comprising one or more layers of polyethylene, one or more layers of EVOH, one or more tie layers, one or more nylon layers, and one or more adhesive layers, wherein an outer layer of the first laminate film is a printable polyethylene layer;

a second laminate film comprising one or more layers of polyethylene, one or more layers of EVOH, one or more tie layers, one or more nylon layers and one or more adhesive layers;

wherein the first laminate film and second laminate film are sealed to each other to create a product chamber;

wherein the first laminate film and the second laminate film are sealed to each other in areas to form air pockets to provide a rigid three-dimensional air frame to the package in an empty state;

wherein, in the first laminate film, at least one of the tie layers, polyethylene layers, EVOH layers or nylon layers further comprises one or more compatibilizers;

wherein, in the second laminate film, at least one of the tie layers, polyethylene layers, EVOH layers or nylon layers further comprise one or more compatibilizers; and wherein the package meets recyclability criteria for curbside recycling.

5. The flexible recyclable package of claim 4, wherein the one or more polyethylene layers of the second laminate film is a sealable polyethylene layer having a thickness ranging from 0.015 to 0.050 mm.

6. The flexible recyclable package of claim 4, wherein the seal between the first and second laminate films has a seal strength of 40 N/25 mm to about 140 N/25 mm.

7. The flexible recyclable package of claim 4, wherein the layers of the first laminate film have a lamination strength between each layer of about 10 N/25 mm to about 20 N/25 mm.

8. The flexible recyclable package of claim 4, wherein the layers of the second laminate film have a lamination strength between each layer of about 10 N/25 mm to about 20 N/25 mm.

9. The flexible recyclable package of claim 4, wherein the material has a gas transmission rate of 0.7 cc/m2 to about 2.5 cc/m2.

10. The flexible recyclable package of claim 4, wherein one or more compatibilizer is in a tie layer.

11. The flexible recyclable package of claim 4, wherein one or more compatibilizer is in an EVOH layer.

12. The flexible recyclable package of claim 4, wherein one or more compatibilizer is in a polyethylene layer.

13. The flexible recyclable package of claim 4, wherein the one or more compatibilizers comprises at least two compatibilizers.

14. The flexible recyclable package of claim 13, wherein the one or more compatibilizers comprises first and second compatibilizers.

15. The flexible recyclable package of claim 14, wherein the first compatibilizer is about 1% by weight and the second compatibilizer is about 14-20% by weight.

16. The flexible recyclable package of claim 14, wherein the first compatibilizer is about 2% by weight and the second compatibilizer is about 12-15% by weight.

17. The flexible recyclable package of claim 14, wherein the first compatibilizer is about 3% by weight and the second compatibilizer is about 11-15% by weight.

18. The flexible recyclable package of claim 14, wherein the first compatibilizer is about 4% by weight and the second compatibilizer is about 8-15% by weight.

19. The flexible recyclable package of claim 14, wherein the first compatibilizer is about 5% by weight and the second compatibilizer is about 8-15% by weight.

20. The flexible recyclable package of claim 14, wherein the first compatibilizer is from about 1-5% by weight.

21. The flexible recyclable package of claim 20, wherein the second compatibilizer is from about 8-20% by weight.

22. A flexible recyclable package comprising:

a first laminate film comprising one or more layers of polyethylene, one or more layers of EVOH, one or more tie layers, one or more nylon layers, and one or more adhesive layers, wherein an outer layer of the first laminate film is a printable nylon layer;

a second laminate film comprising one or more layers of polyethylene, one or more layers of EVOH, one or more tie layers, one or more nylon layers and one or more adhesive layers;

wherein the first laminate film and second laminate film are sealed to each other to create a product chamber;

wherein the first laminate film and the second laminate film are sealed to each other in areas to form air pockets to provide a rigid three-dimensional air frame to the package in an empty state;

wherein, in the first laminate film, at least one of the tie layers, polyethylene layers, EVOH layers or nylon layers further comprises one or more compatibilizers;

wherein, in the second laminate, at least one of the tie layers, polyethylene layers, EVOH layers or nylon layers further comprises one or more compatibilizers; and wherein the package meets recyclability criteria for curbside recycling.

23. The flexible recyclable package of claim 22, wherein the one or more polyethylene layer of the first laminate film is a sealable polyethylene layer having a thickness ranging from 0.015 to 0.050 mm.

24. The flexible recyclable package of claim 22, wherein the seal between the first and second laminate films has a seal strength of 40 N/25 mm to about 140 N/25 mm.

25. The flexible recyclable package of claim 22, wherein the layers of the first laminate have a lamination strength between each layer of about 10 N/25 mm to about 20 N/25 mm.

26. The flexible recyclable package of claim 22, wherein the layers of the second laminate have a lamination strength between each layer of about 10 N/25 mm to about 20 N/25 mm.

27. The flexible recyclable package of claim 22, wherein the material has a gas transmission rate of 0.7 cc/m2 to about 2.5 cc/m2.

28. The flexible recyclable package of claim 22, wherein the one or more compatibilizers comprises at least two compatibilizers.

29. The flexible recyclable package of claim 22, wherein one or more compatibilizers are in a tie layer.

30. The flexible recyclable package of claim 22, wherein one or more compatibilizers are in an EVOH layer.

31. The flexible recyclable package of claim 22, wherein one or more compatibilizers are in a polyethylene layer.

32. The flexible recyclable package of claim 22, wherein the one or more compatibilizers comprises first and second compatibilizers.

33. The flexible recyclable package of claim 32, wherein the first compatibilizer is from about 1-5% by weight.

34. The flexible recyclable package of claim 33, wherein the second compatibilizer is from about 8-20% by weight.

35. The flexible recyclable package of claim 32, wherein the first compatibilizer is about 1% by weight and the second compatibilizer is about 14-20% by weight.

36. The flexible recyclable package of claim 32, wherein the first compatibilizer is about 2% by weight and the second compatibilizer is about 12-15% by weight.

37. The flexible recyclable package of claim 32, wherein the first compatibilizer is about 3% by weight and the second compatibilizer is about 11-15% by weight.

38. The flexible recyclable package of claim 32, wherein the first compatibilizer is about 4% by weight and the second compatibilizer is about 8-15% by weight.

39. The flexible recyclable package of claim 32, wherein the first compatibilizer is about 5% by weight and the second compatibilizer is about 8-15% by weight.

* * * * *